US007139824B2

(12) United States Patent
Grech et al.

(10) Patent No.: US 7,139,824 B2
(45) Date of Patent: Nov. 21, 2006

(54) METHOD AND SYSTEM FOR ISOLATING AND SIMULATING DROPPED PACKETS IN A COMPUTER NETWORK

(75) Inventors: Anthony Grech, Beacon, NY (US); Luke M. Hopkins, Poughkeepsie, NY (US); Theodore R. Maeurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 09/995,474

(22) Filed: Nov. 28, 2001

(65) Prior Publication Data

US 2003/0112800 A1   Jun. 19, 2003

(51) Int. Cl.
*G06F 15/173* (2006.01)

(52) U.S. Cl. .................. 709/224; 709/223; 709/226; 709/225

(58) Field of Classification Search ................ 709/224; 370/227
See application file for complete search history.

(56) References Cited

U.S. PATENT DOCUMENTS

| 4,561,090 | A | * | 12/1985 | Turner ..................... 370/231 |
| 4,638,356 | A | * | 1/1987 | Frezza ..................... 380/200 |
| 5,233,607 | A | * | 8/1993 | Barwig et al. ............. 370/397 |
| 5,390,188 | A | * | 2/1995 | Dawson .................... 714/717 |
| 5,542,047 | A | * | 7/1996 | Armstrong ................. 709/224 |
| 5,563,875 | A | * | 10/1996 | Hefel et al. ............... 370/249 |
| 5,668,800 | A | * | 9/1997 | Stevenson ................. 370/248 |
| 5,874,992 | A | * | 2/1999 | Caporizzo ................. 348/192 |
| 5,987,629 | A | * | 11/1999 | Sastry et al. ............... 714/48 |
| 6,058,102 | A | * | 5/2000 | Drysdale et al. ........... 370/252 |
| 6,477,571 | B1 | * | 11/2002 | Ross ........................ 709/224 |
| 6,549,513 | B1 | * | 4/2003 | Chao et al. ................ 370/227 |
| 6,735,702 | B1 | * | 5/2004 | Yavatkar et al. ............ 726/13 |
| 2001/0005371 | A1 | * | 6/2001 | Sera ......................... 370/394 |

FOREIGN PATENT DOCUMENTS

JP   7107097   4/1995

OTHER PUBLICATIONS

IBM Technical Disclosure Bulletin, Sep. 1990, v33, n4, pp. 21-28: "Overflow/Fault Recovery using Automatic Network Routing".*
Computer, Apr. 1999, v32, n4, pp. 97-98, 102: "Mapping the Internet".*
Parallel and Distributed Processing. Proceedings of the Second IEEESymposium, Dec. 1990, pp. 190-194:☐☐"High-speed propagation of link status routing control information".*
Parallel and Distributed Processing. Proceedings of the Second IEEESymposium, Dec. 1990, pp. 190-194: "High-speed propagation of link status routing control information".

* cited by examiner

*Primary Examiner*—Zarni Maung
*Assistant Examiner*—Dhairya A. Patel
(74) *Attorney, Agent, or Firm*—William Kinnaman; Cantor Colburn LLP

(57) ABSTRACT

An exemplary embodiment of the present invention is a method and system for isolating dropped packets in a computer network. A request for network analysis that includes a source node and a destination node is received by the invention. A map of the expected path between the two points, including the probes along the route is then generated. A capture filter profile for each probe along the route is created. A request to perform data collection is transmitted, along with the capture filter profile, to each of the probes along the route. Data is received back from the data collection in the form of a data log. Exception data is generated by comparing the data log to the expected path between the two points. Additional embodiments include a system and storage medium for isolating dropped packets in a computer network.

48 Claims, 5 Drawing Sheets

METHOD AND SYSTEM FOR ISOLATING AND SIMULATING DROPPED PACKETS IN A COMPUTER NETWORK

FIELD OF THE INVENTION

The present invention relates generally to computer networks. More particularly, the present invention relates to diagnosing the source of network errors by providing an automated tool to isolate and simulate dropped packets in a computer network.

BACKGROUND OF THE INVENTION

The ability to rapidly identify and fix transmission errors in network systems has become increasingly important as more businesses have come to rely on applications and data that span multiple networks. Transmission packets in a computer network can be dropped at multiple points in the network resulting in applications that do not respond, experience poor performance as a result of packet retransmits, or behave unexpectedly. Dropped packets can be caused by a failing router or communication controller hardware, as well as by software defects. Isolating dropped packets requires traces to be gathered at multiple points in a network. Once collected, these traces must be correlated and analyzed by multiple experts as dictated by virtue of the various computing and network environments involved. This correlation and analysis process is manual and time consuming, which can result in long and costly problem isolation scenarios.

For example, a mainframe application may not be responding due to a partner application that did not respond, resulting in packets that did not reach their destination. To determine why and where packets were lost, traces would need to be collected on the mainframe, on transactions leaving the mainframe, at retransmission points, and at the target destination. Multiple experts would be required to analyze the packet traces and determine at which point packets were dropped. In another example, a mainframe application, using a mainframe operating system (e.g. OS/390) may stop functioning while communicating with an engineering workstation (e.g. RS/6000) application. Here, the packet flow could include going from the mainframe to a controller (e.g. 3174) then over a token ring LAN (local area network) to reach the engineering workstation. The network protocol could be any one known in the art including SNA (System Network Architecture) and IP (Internet Protocol). Experts would be required on the mainframe, on the controller, on the token ring LAN, and on the engineering workstation in order to fully analyze the problem. In addition, multiple recreations of the network failure would be required to diagnose the problem.

SUMMARY OF THE INVENTION

An exemplary embodiment of the present invention is a method and system for isolating dropped packets in a computer network. A request for network analysis that includes a source node and a destination node is received by the invention. A map of the expected path between the two points, including the probes along the route is then generated. A capture filter profile for each probe along the route is created. A request to perform data collection is transmitted, along with the capture filter profile, to each of the probes along the route. Data is received back from the data collection in the form of a data log. Exception data is generated by comparing the data log to the expected path between the two points. Additional embodiments include a system and storage medium for isolating dropped packets in a computer network.

DETAILED DESCRIPTION OF THE INVENTION

Figure 1:
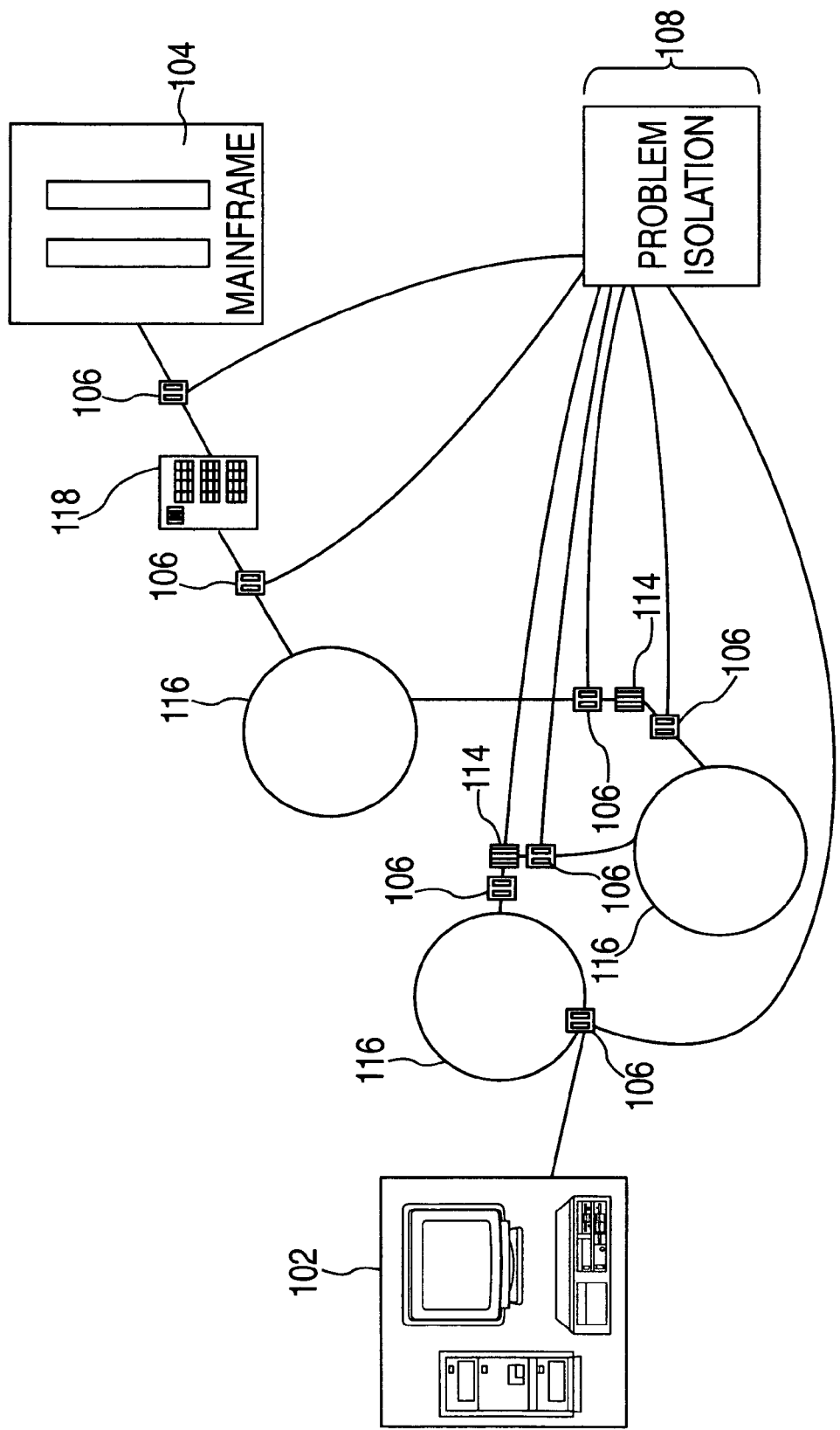
FIG. 1 is a block diagram of an exemplary embodiment of a system for isolating dropped packets in a computer network.

The present invention aids in diagnosing network problems and helps to minimize the amount of human expertise required to debug network problems by providing an automated mechanism to isolate and simulate dropped packets. A block diagram of an exemplary embodiment of a system to carry out the present invention is shown in FIG. 1. The block diagram depicts an engineering workstation (e.g. RS/6000) source system 102 and a mainframe (e.g. S/390) destination system 104. In FIG. 1 the source system 102 and destination system 104 are separated by various networks 116 that are connected by gateways 114. The source system 102 and destination system 104 can be built on any type of computer system hardware that is known in the art. The networks 116 can be based on any communication protocol that is known in the art (e.g. SNA and IP). FIG. 1 also depicts the destination system 104 being connected to the network 116 through a controller 118. Probes 106 have been inserted at various points in the network to perform data collection. The probes 106 can be put into the network ahead of time or be inserted in response to a specific network problem. In addition, the probes 106 could be collecting data on a continuous basis about each packet that passes through the probe 106 or collecting data only in response to a request for problem analysis of a specific network problem. These probes 106 are connected to the problem isolation system 108 that drives the collection and correlation of the probe 106 data.

Many system configurations are possible, the block diagram in FIG. 1 is meant to illustrate one of these configuration and not meant to limit the present invention to this specific configuration. Any network configurations, both hardware and software, that are capable of supporting probes can be used with the present invention. The concept of the present invention described herein is extensible to a variety of physical transport mediums including twisted pair cable, coax and fiber. The present invention is also extensible to a variety of link layer protocols including ethernet, token ring and ESCON.

Probes have been developed for most major media types including token ring, ethernet, fast ethernet, asynchronous transfer mode (ATM), frame relay, and fiber distributed data interface (FDDI). Depending on the media type, probes have been designed to be connected to hubs and rings, or integrated into switch backplanes. As is known in the art, many probes support both network statistics and capture functions. Referring to FIG. 1, probes 106 have been inserted at various points in the network 116 to identify the location at which the packets are lost. These probes 106 are linked to the problem isolation system 108 and each probe 106 will log information depending on the setting of a capture filter by the problem isolation system 108. The capture filter of each probe 106 will be programmed by the problem isolation system 108 at the beginning of each analysis event. A probe 106 will only log packets that satisfy the capture filter. During analysis the problem isolation system 108 will request information from each probe 106.

The connectivity from probe 106 to the problem isolation system 108 can be achieved using industry standard protocols including Transmission Control Protocol/Internet Protocol (TCP/IP) over a network infrastructure. Connectivity via an existing network at a corporation is an option because in an exemplary embodiment the filtering of the packets will occur at the probes 106 during diagnosis, and communication between probes 106 and the problem isolation system 108 of the present invention can be easily distinguished from regular network traffic. Further, because the probes 106 are capable of buffering captured data, no additional traffic need be generated during the measurement interval. In another embodiment, a separate network can be utilized to connect the probes 106 to the problem isolation system 108. This would increase the cost but would provide some amount of additional reliability and separation.

Figure 2:
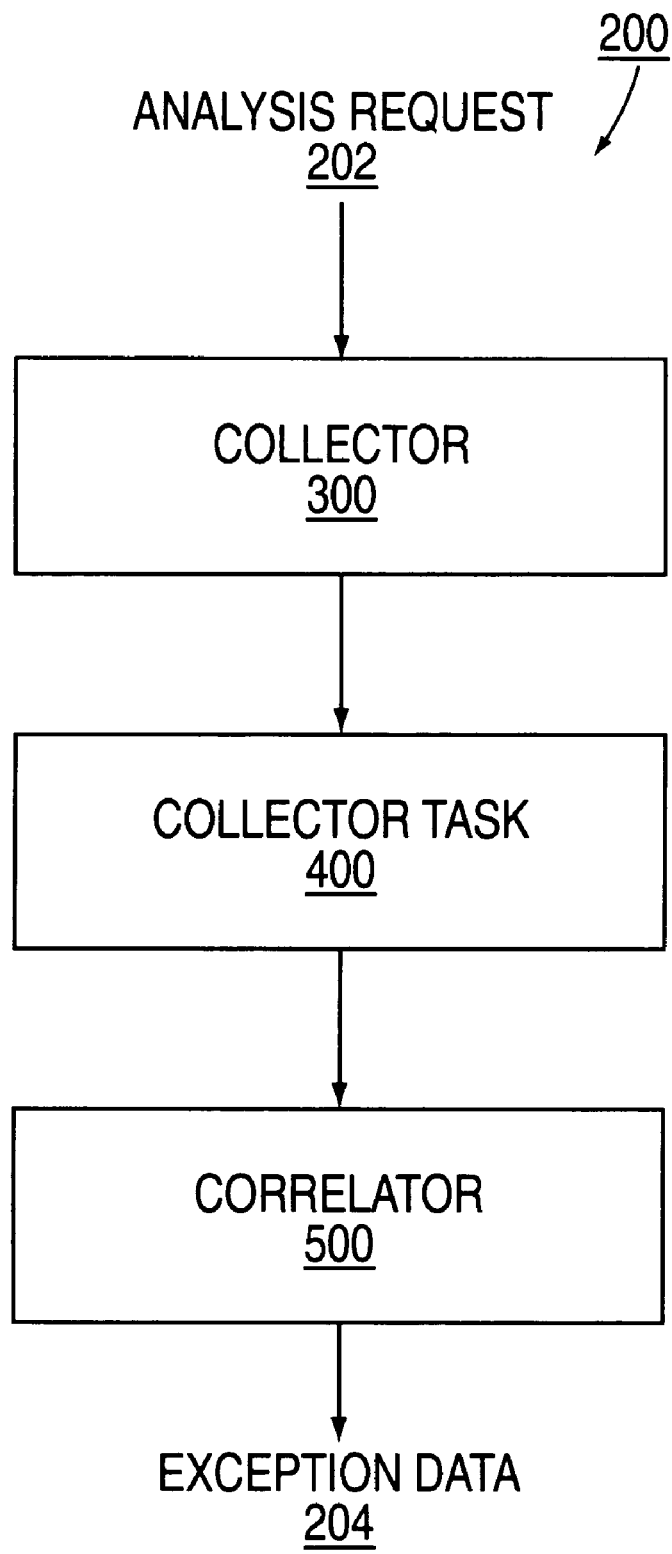
FIG. 2 is a flowchart of an exemplary high level application flow of the software for performing isolation of dropped packets in a computer network.

FIG. 2 is a flowchart of an exemplary high level application flow of the problem isolation system 108 for performing the present invention. An analysis request 202 initiates the process. In an exemplary embodiment, the analysis request 202 contains a source node, a destination node and a network protocol identifier. An analysis request 202 can be initiated manually by an operator using the collector application 300. An analysis request 202 could also be initiated automatically by an agent in a network such as a client or server. To facilitate automatic initiation of problem analysis, a protocol stack can invoke a service in the agent to send an analysis request 202 to the collector application 300. In an exemplary embodiment, the message sent to the collector application 300 would include the source or originator, the destination, information about the network protocol, and optionally, any information that the originator has about the route between the two endpoints. An endpoint may be programmed to request analysis when a retransmission threshold has been exceeded, or based on some other criteria.

When the collector application 300 receives an analysis request 202 it will perform some preliminary actions and then schedule the collector task application 400. The scheduling of the collector task application 400 can be restricted by some user programmed criteria. For example, it might be that a field engineer wants to focus on failures between a small number of selected endpoints. The collector task application 400 could then be programmed to reject all requests for analysis between other network endpoints. In an exemplary embodiment, when the collector task application 400 is complete, the correlator application 500 will be invoked to perform analysis to determine at which point the packets were lost and to output this information in the form of exception data 204. Each of these application modules is discussed in more detail below.

Figure 3:
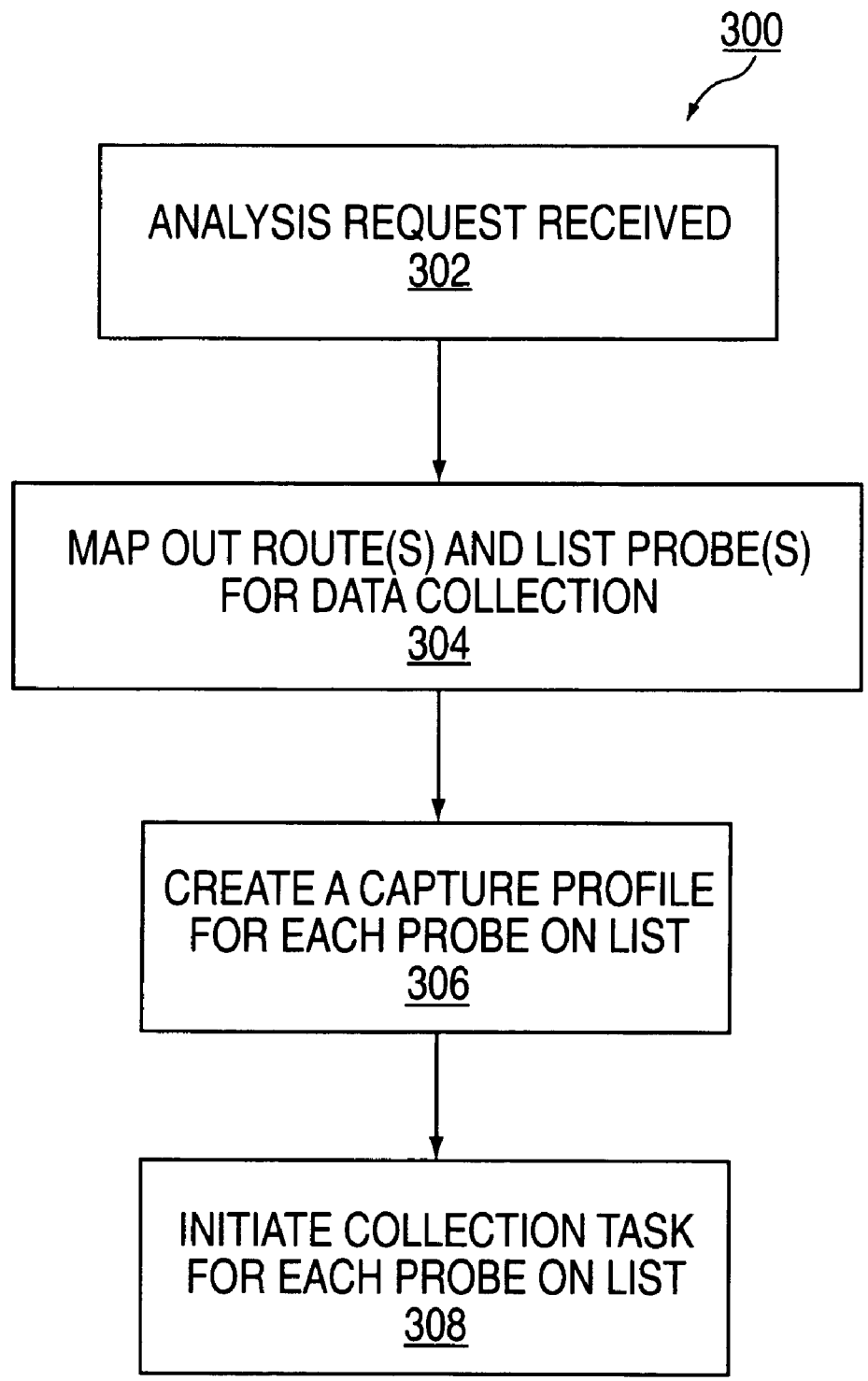
FIG. 3 is an exemplary collector application flowchart.

FIG. 3 is a flowchart of processing performed by an exemplary collector application 300. At step 302, the analysis request 202 containing a source 102, a destination 104, and a network protocol type is received by the collector application 300. Next, at step 304, the set of possible routes between the source 102 and destination 104 are mapped, along with the probes required for data capture along these routes. Generally this set contains one route but in some cases there may be multiple routes. The set of possible routes can be determined by topology information accessed by the collector application 300; by routing and protocol information provided in the analysis request 202; and by information provided by elements in the network (e.g. a router table). If a route is not found, the software at this step can determine a route between the source 102 and destination 104 by observing frames injected by probes 106 in the network. Once a route is found, the smallest set of probes required to capture data along the route is determined.

At step 306, for each probe 106 in the set of probes determined in step 304, a capture filter is created. The capture filter is formulated to be as restrictive as possible in capturing data between the two endpoints. The capture filter can be determined by information provided in the analysis request, such as source 102 and destination 104 address information, and by the protocol used to communicate between the two endpoints. Additionally, the position of a probe in the network and the type of network segment that the probe is attached to can be used to determine the capture filter. A provision can be made in the analysis request message 202 to allow the originator to suggest more detail to the collector application 300 about the capture filter that should be programmed. For example, if frequent re-transmissions are occurring on a reliable link that has been established between the two endpoints, information could be passed in the analysis request message 202 that identifies the reliable link, and a more restrictive filter could be programmed. For example, if the two endpoints are using an 802.2 protocol to communicate in a LAN environment, such as SNA, in addition to the source and destination MAC addresses, the originator could include the source and destination Service Access Point (SAP's), thereby uniquely identifying a specific 802.2 connection.

At step 308, after the capture filters for each probe 106 are determined, they are programmed into each probe 106, and each probe 106 is instructed to begin capturing data. The probes 106 are also instructed on the duration of the capture. The duration of a capture may be determined by a combination of a period of time that is suggested by the originating end point in the analysis request message; the capacity of the probe capture buffer; and the collector application 300 imposed scheduling constraints. Steps 306 and 308 are performed for each probe 106 in the set of probes determined in step 304.

Sample pseudo code for an exemplary collector application 300 is as follows:

```
Main:
    Wait for an Analysis_Request;
    Schedule_Execution;
    Return to Main.
Schedule_Execution:
    Check if there are any restrictions on the route;
    Determine route and probes to use;
    For each probe:
        Create capture filter profile that includes source and
            destination address of the packets to be collected as
            well as the network protocol used;
        Spawn Collection_Task;
    Return.
```

Figure 4:
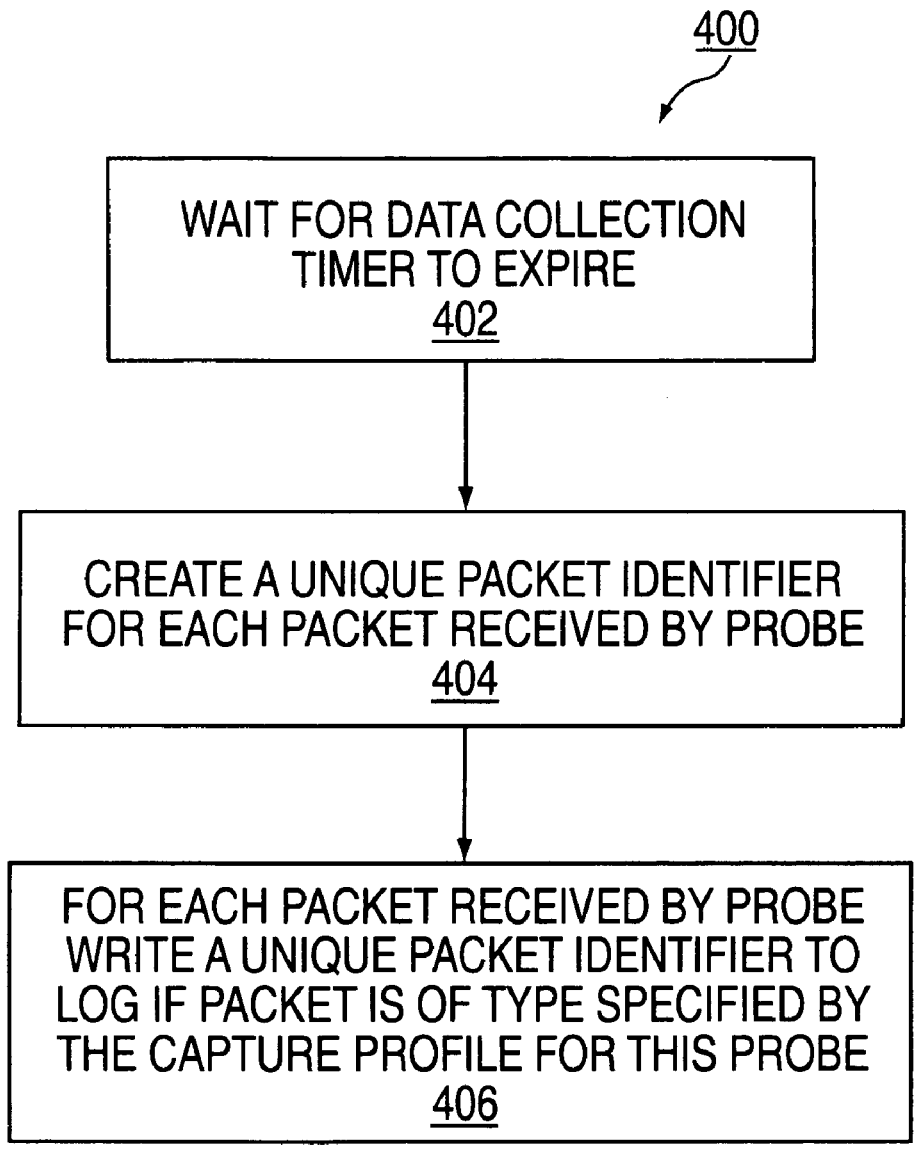
FIG. 4 is an exemplary collection task application flowchart.

FIG. 4 is a flowchart of processing performed by an exemplary collection task application 400. This collection task application 400 is called for each probe 106 in the set of probes as determined by the collector application 300. At step 402, the collection task 400 waits for the time specified as the duration of the capture to expire. Next, at step 404, a unique packet identifier is created for each packet received by the probe 106. In an exemplary embodiment, the unique packet identifier includes the source 102, destination 104, probe identifier, and a unique identifier. The unique identifier is determined based on the network protocol associated with the packet. The packets can be multi-protocol packets, including SNA and IP packets as indicated by the frame type indicator. At step 406, the application checks to see if the packet identifier matches the type of packet specified by the capture filter profile for the probe. If it does match, a log entry containing the unique packet identifier is created. Steps 404 and 406 are performed for each packet received by the probe 106.

Sample pseudo code for an exemplary collection task application 400 is as follows:

Collection_Task:
    When timer expires request data from probes;
    For each packet received by the probe do:
        Determine protocol of packet;
            Based on protocol retrieve unique identification information for packet;
            Use unique identification information to form a packet identifier which also includes the probe on which the packet was seen;
            Write packet identifier to the log if it matches the filter profile established previously;
    End;
End of Collection Task.

Figure 5:
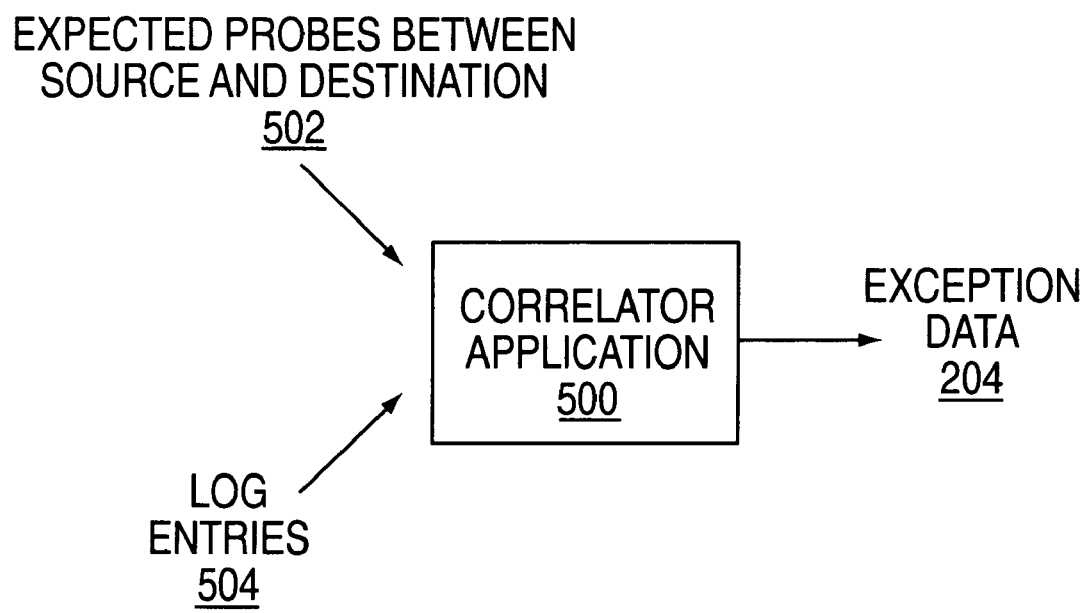
FIG. 5 is an exemplary correlator application data flow diagram.

FIG. 5 depicts the data flow of an exemplary correlator application 500. The input data includes the list of expected probes between the source and destination 502 created in step 304 of FIG. 3 and the log entries 504 created in step 406 of FIG. 4. The output data includes exception data 204 that can be used to isolate the dropped packet. This exception data 204 can be used to initiate a software program or to trigger a hardware action. For example, it could be used to trigger an automatic data re-transmit at a particular node or it could be used to generate a notice to be sent a particular person notifying them of the error. Based on the data collected by the collector application 300 and the collector task 400 many kinds of analysis can be performed in order to isolate the dropped packet in the network.

In an exemplary embodiment of the correlator application 500, exception data can be created without collecting the contents of the probe capture buffers. Two separate frame counts can be determined for each probe 106 in the measurement set for a given time interval. One count can indicate the number of frames sent from a source probe 106 and the other count can indicate the number of frames sent from a destination probe 106. If there is a statistically significant difference in the number of packets observed between the respective counts of two probes 106 along a route during the specified time interval, then a failing network element can be identified. Statistical significance can be based on the total number of packets transmitted by the source destination probes, and the error in synchronization of the sample interval for each of the probes in relation to the duration of the sample interval. In an exemplary embodiment, the time interval would be made equal to the entire capture interval for maximum accuracy.

The next step in creating exception data, in an exemplary embodiment, would be conducted if the network protocol adds sequence numbers to the frames in the packets. If a protocol is executed that includes sequence numbers, an exemplary embodiment of the correlator application 500 would start by looking at the data from the probe 106 closest to the destination 104 for gaps in the sequence numbers. If a gap in the sequence numbers is present, then it indicates at least one dropped packet. An exemplary embodiment of the correlator application 500 would then locate the packet with the highest sequence number prior to the gap and proceed backwards from the probe 106 along all routes extending from the segment that contains the probe 106. It would then identify this packet on the prior segment to see if a corresponding gap exists on the previous segments. If the gap doesn't exist on a previous segment than an element has been identified which is dropping packets.

Using the data collected by the problem isolation system 108, there are many additional methods of looking for lost packets and determining the location of a failing component. In exemplary embodiment, exception data can be created by viewing each packet generated by the source 102 and an attempt could be made to trace the path of each packet through the network. If sequence numbers are present, and allowing for latency of network elements, the correlator application 500 could look for the corresponding element on the output side of the network element. Similarly, the correlator application 500 could do correlation of packets without sequence numbers based on assumptions about propagation delay through the network elements along a route. When the analysis is complete, the exception data 204 could include a map of the topology which indicates the network elements that were identified as dropping packets. If the above analysis shows no problem in the network, further analysis of captured data can be performed to determine which end point is failing. This can be made based on a knowledge of the protocol being exercised and request response pairs. If the destination is not producing responses then it is in error, and if the source is receiving responses but still requesting retransmission of packets then the source is implicated.

Sample pseudo code for an exemplary correlator application 506 is as follows:

```
Main:
    Create packet list to keep track of what probes
    saw each unique packet;
    Spawn Exception_Task;
    Do forever:
        For each packet in the log:
            If packet entry does not exist in packet list add packet entry
            for packet to the packet list;
            On initial create of the packet entry add the source and
            destination address of the packet to the entry;
            Add probe identifier to packet entry if not already entered
            for that probe;
        End;
End.
Exception_Task:
    Do at specified intervals:
        For each packet entry in the packet list:
            Identify those entries that are missing probe identifiers and
            write out packet entry including probe list for human
            analysis;
End.
```

The present invention can be extended to encompass more than a single two point route and is extensible to more complicated topologies. Packet loss point detection can be performed across multiple network routes with a number of start and end points. For example, the problem analyst may be interested in performing packet loss detection from a given host to or from any of several workstations. In this case, the capture profile would specify the host as well as each workstation. A boolean expression can be used to indicate match criteria in the correlator application 500. In the present example, the host is monitored by probe P1 and the workstations are monitored by probes P2 through P5. If the analyst is concerned only that the host packets arrive at any given workstation, then an expression such as (Seen at P1) and (Seen at P2 or P3 or P4 or P5) may be used to indicate a successful match. If a packet seen at P1 is not seen at any of P2 through P5 then an exception is generated. This function is also useful if the packet may take any one of several routes in traveling from a given host to a given workstation. If the problem analyst needs to verify that a packet sent from the host and intended for workstation W2 does in fact arrive at W2, then an expression such as (Seen at P1 and Destination is W2) and (Seen at P2) may be used. If a packet seen at P1 with a destination address of W2 is not also seen at P2, then an exception is generated. This approach may be used to perform analysis for an arbitrary number of network start and end points. Furthermore, the logs generated for a single capture interval by the collector can be analyzed in several different ways by providing the various boolean expressions to the correlator application 500. Thus, the problem analysts can analyze the log data and create exception data in a variety of manners in order to gain insight into the problem at hand.

In the embodiments of the invention discussed previously, the probes 106 and problem isolation system 108 operate in passive mode. This mode is a pure listening and collecting mode. In another embodiment of the present invention, the probes 106 and problem isolation system 108 operate in an active mode. In active mode, the probe 106 and problem isolation system 108 perform manipulations on network traffic. Thus, the data actually passes through the probe 106 and problem isolation system 108 back out to the network. As such, the probe 106 and problem isolation system 108 essentially insert themselves into the network link. The intent of such a function is to recreate a customer problem either in the customer environment or in a lab environment. Loss of packets can be simulated at various points in the network to generate host or workstation application failures. In addition, network congestion scenarios can be simulated by queuing packets in the probe capture buffers and releasing them at a prescribed rate. This will allow the problem analysts to confirm a potential problem diagnosis and allow product owners to test the robustness of their products against a variety of network operating conditions.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for performing isolation of dropped packets, said method comprising:

receiving a request to isolate a dropped packet in a network, said request including a source node and a destination node;

mapping an expected route between the source node and the destination node, said expected route including a probe in an active mode;

creating a capture filter profile for said probe, said capture filter profile including instructions to cause said probe to simulate network errors;

transmitting a request to said probe to perform data collection in response to said capture filter profile;

receiving said data collection request at said probe;

programming said probe in response to said capture filter profile;

receiving a data log from said probe, said data log created by said data collection;

generating exception data including comparing said expected route to said data log, said generating exception data further includes generating output data that includes the number of log entries corresponding to said probe and the number of log entries corresponding to a second probe, wherein said log entries are contained in said data log, and wherein said probe is a source probe and said second probe is a destination probe and tracking a packet from said source node to said destination node using a boolean expression and generating output data that includes the results of said tracking:

isolating the dropped packet by identifying a failing network element along the expected route in response to the exception data;

capturing packet data for a time period specified by said capture filter profile;

writing a packet data identifier to said data log when said packet data matches said capture filter profile; and transmitting said data log to requestor of said data collection.

2. The method of claim 1 wherein said request to isolate a dropped packet further includes a network protocol identifier.

3. The method of claim 1 wherein said request to isolate a dropped packet further includes restrictions on said expected route.

4. The method of claim 3 wherein said mapping is altered in response to said restrictions on said expected route.

5. The method of claim 1 wherein said capture filter profile further includes said source node and said destination node.

6. The method of claim 5 wherein said capture filter profile further includes a network protocol identifier.

7. The method of claim 1 wherein said request to isolate a dropped packet is initiated programmatically by an agent in a network endpoint.

8. The method of claim 1 wherein said mapping an expected route is restricted based on network topology data.

9. The method of claim 1 wherein said data log comprises:
said source node, said destination node, a probe identifier, and a unique packet identifier.

10. The method of claim 1 further comprising:
transmitting a retransmission request to a specified node in response to said exception data.

11. The method of claim 1 further comprising:
transmitting a notification to a specified node in response to said exception data.

12. The method of claim 1 wherein said data log further comprises a frame sequence number.

13. The method of claim 12 wherein said generating exception data further includes:
tracking a packet from said source node to said destination node using said frame sequence number; and
generating output data that includes the results of said tracking.

14. The method of claim 1 wherein said probe is in a passive mode.

15. The method of claim 1 further comprising:
capturing packet data for every packet received by said probe.

16. The method of claim 1 further comprising:
capturing packet data on a continuous basis at said probe.

17. A system for performing isolation of dropped packets in a network, said system comprising a problem isolation system in communication with said network, said problem isolation system implementing a process comprising:
receiving a request to isolate a dropped packet in a network, said request including a source node and a destination node;
mapping an expected route between the source node and the destination node, said expected route including a probe in an active mode;
creating a capture filter profile for said probe, said capture filter profile including instructions to cause said profile to simulate network errors;
transmitting a request to said probe to perform data collection in response to said capture filter profile;
receiving said data collection request at said probe;
programming said probe in response to said capture filter profile;
receiving a data log from said probe, said data log created by said data collection;
generating exception data including comparing said expected route to said data log, said generating exception data further includes generating output data that includes the number of log entries corresponding to said probe and the number of log entries corresponding to a second probe, wherein said log entries are contained in said data log, and wherein said probe is a source probe and said second probe is a destination probe and tracking a packet from said source node to said destination node using a boolean expression and generating output data that includes the results of said tracking;
isolating the dropped packet by identifying a failing network element along the expected route in response to the exception data;
capturing packet data for a time period specified by said capture filter profile;
writing a packet data identifier to said data log when said packet data matches said capture filter profile; and
transmitting said data log to requestor of said data collection.

18. The system of claim 17 wherein said request to isolate a dropped packet further includes a network protocol identifier.

19. The system of claim 17 wherein said request to isolate a dropped packet further includes restrictions on said expected route.

20. The system of claim 19 wherein said mapping is altered in response to said restrictions on said expected route.

21. The system of claim 17 wherein said capture filter profile further includes said source node and said destination node.

22. The system of claim 21 wherein said capture filter profile further includes a network protocol identifier.

23. The system of claim 17 wherein said request to isolate a dropped packet is initiated programmatically by an agent in a network endpoint.

24. The system of claim 17 wherein said mapping an expected route is restricted based on network topology data.

25. The system of claim 17 wherein said data log comprises:
said source node, said destination node, a probe identifier, and a unique packet identifier.

26. The system of claim 17 further comprising:
transmitting a retransmission request to a specified node in response to said exception data.

27. The system of claim 17 further comprising:
transmitting a notification to a specified node in response to said exception data.

28. The system of claim 17 wherein said data log further comprises a frame sequence number.

29. The system of claim 28 wherein said generating exception data further includes:
tracking a packet from said source node to said destination node using said frame sequence number; and
generating output data that includes the results of said tracking.

30. The system of claim 17 wherein said probe is in a passive mode.

31. The system of claim 17 further comprising:
capturing packet data for every packet received by said probe.

32. The system of claim 17 further comprising:
capturing packet data on a continuous basis at said probe.

33. A storage medium encoded with machine-readable computer program code for performing isolation of dropped packets, the storage medium storing instructions for causing a problem isolation system to implement a method comprising:
receiving a request to isolate a dropped packet in a network, said request including a source node and a destination node;
mapping an expected route between the source node and the destination node, said expected route including a probe in an active mode;
creating a capture filter profile for said probe, said capture filter profile including instructions to cause said profile to simulate network errors;
transmitting a request to said probe to perform data collection in response to said capture filter profile;
receiving said data collection request at said probe;
programming said probe in response to said capture filter profile;
receiving a data log from said probe, said data log created by said data collection;
generating exception data including comparing said expected route to said data log, said generating exception data further includes generating output data that includes the number of log entries corresponding to said probe and the number of log entries corresponding to a second probe, wherein said log entries are contained in said data log, and wherein said probe is a source probe and said second probe is a destination probe and tracking a packet from said source node to said destination node using a boolean expression and generating output data that includes the results of said tracking;

isolating the dropped packet by identifying a failing network element along the expected route in response to the exception data;

capturing packet data for a time period specified by said capture filter profile;

writing a packet data identifier to said data log when said packet data matches said capture filter profile; and transmitting said data log to requestor of said data collection.

34. The storage medium of claim 33 wherein said request to isolate a dropped packet further includes a network protocol identifier.

35. The storage medium of claim 33 wherein said request to isolate a dropped packet further includes restrictions on said expected route.

36. The storage medium of claim 35 wherein said mapping is altered in response to said restrictions on said expected route.

37. The storage medium of claim 33 wherein said capture filter profile further includes said source node and said destination node.

38. The storage medium of claim 37 wherein said capture filter profile further includes a network protocol identifier.

39. The storage medium of claim 33 wherein said request to isolate a dropped packet is initiated programmatically by an agent in a network endpoint.

40. The storage medium of claim 33 wherein said mapping an expected route is restricted based on network topology data.

41. The storage medium of claim 33 wherein said data log comprises:

said source node, said destination node, a probe identifier, and a unique packet identifier.

42. The storage medium of claim 33 further comprising instructions for causing the problem isolation system to implement:

transmitting a retransmission request to a specified node in response to said exception data.

43. The storage medium of claim 33 further comprising instructions for causing the problem isolation system to implement:

transmitting a notification to a specified node in response to said exception data.

44. The storage medium of claim 33 wherein said data log further comprises a frame sequence number.

45. The storage medium of claim 44 wherein said generating exception data further includes:

tracking a packet from said source node to said destination node using said frame sequence number; and generating output data that includes the results of said tracking.

46. The storage medium of claim 33 wherein said probe is in a passive mode.

47. The storage medium of claim 33 further comprising:

capturing packet data for every packet received by said probe.

48. The storage medium of claim 33 further comprising:

capturing packet data on a continuous basis at said probe.

* * * * *